United States Patent [19]

Zemba, Jr. et al.

[11] Patent Number: 4,734,176

[45] Date of Patent: Mar. 29, 1988

[54] PULSED ION GENERATOR FOR WATER PURIFICATION SYSTEM

[75] Inventors: Joseph A. Zemba, Jr., Merritt Island; Paul Taylor, Cocoa, both of Fla.

[73] Assignee: Pure-N-Simple, Fla.

[21] Appl. No.: 7,110

[22] Filed: Jan. 27, 1987

[51] Int. Cl.$^4$ ............................................. C02F 1/46
[52] U.S. Cl. .................................... 204/149; 204/228
[58] Field of Search ................ 204/149, 152, 228, 240

[56] References Cited

U.S. PATENT DOCUMENTS

| | | | |
|---|---|---|---|
| 3,865,710 | 2/1975 | Phipps | 204/152 |
| 4,263,114 | 4/1981 | Shindell | 204/240 |
| 4,525,253 | 6/1985 | Hayes | 204/228 |

*Primary Examiner*—T. M. Tufariello
*Attorney, Agent, or Firm*—Antonelli, Terry & Wands

[57] ABSTRACT

An electrolysis water purification system employs a fixed magnitude ionization current source the output of which is effectively pulse-width modulated, by controlled switching of the connection of the current source to the ionizing electrodes. As a consequence, ion production can be controlled as a percentage of water flow time (the period during which the filtration pump is operating) and is evenly distributed throughout the water to be purified. The output of a DC power supply is coupled through a controlled switching circuit to the ionizing electrodes. The controlled switching circuit includes a presettable timer-controlled switch that operates under the control of clock generator and establishes the duty cycle of the supply of ionizing current to the electrodes. The output of the presettable timer-controlled switch is coupled through a timer-controlled polarity reversing circuit to the ionizing electrodes. The polarity reversing circuit serves to periodically reverse the current flow through the ionizing electrodes to ensure uniform wear of the electrodes and automatic cleaning of the deposits off the electrodes.

17 Claims, 3 Drawing Figures

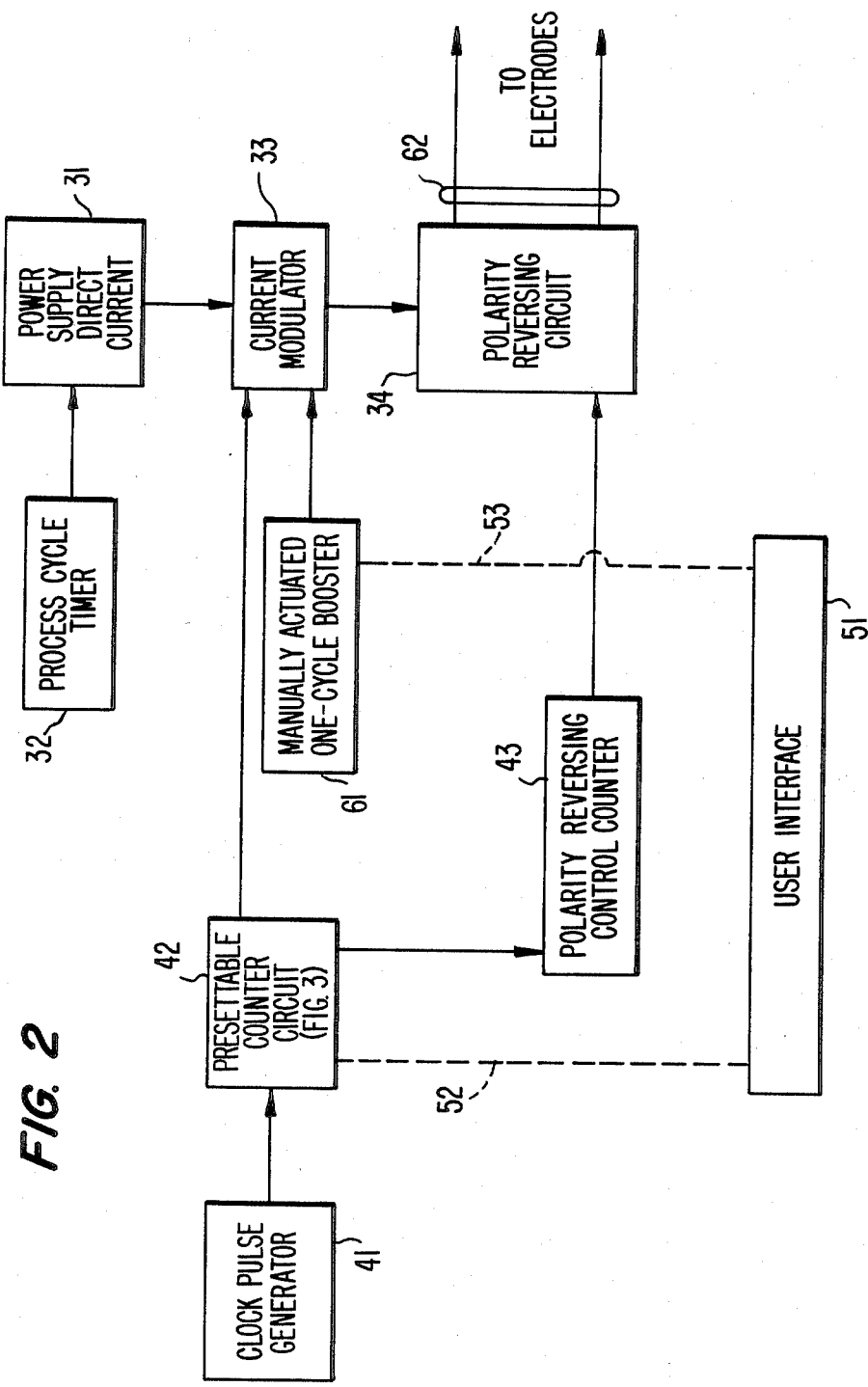

PULSED ION GENERATOR FOR WATER PURIFICATION SYSTEM

FIELD OF THE INVENTION

The present invention relates, in general, to water purification systems, and is particularly directed to an improved electrical control system for controlling the application of ionization potentials to electrodes of an electrolysis purification device.

BACKGROUND OF THE INVENTION

Electrical water purification systems, such as those employed in recreational environments including swimming pools, spas, hot tubs, etc., typically employ a pair of spaced apart electrodes to which a controlled voltage is applied for causing an introduction of metallic ions into the water which kills organic impurities in the water. The subsequent charge potential of the organic impurities causes the dead impurities to be attracted to one another for form large particles that are removed by filtration. With the passage of time the ionization process results in the formation of deposits on the anode which must be removed. For this purpose the polarity of the ionization potentials applied to the electrodes is reversed for a prescribed period of time to cause the deposits to be driven off. In such systems the degree or extent of purification is normally controlled by adjusting the magnitude of the ionization voltage applied to the electrodes; typically the adjustment mechanism involves the controlled insertion of voltage dropping resistors between a large DC power supply and the electrolysis electrodes. Such an adjustment mechanism has a number of drawbacks, not the least of which is the waste of energy.

More particularly, while the adjustment mechanism is a necessary expedient, allowing the quantity of injected ions (and consequently degree of water purification) to be varied in accordance with application and water conditions, the use of a bank of fixed resistors to set the potential level at the ionizing electrodes means that adjustability can be varied only in coarse increments, and the generation of lower valued potentials requires a substantial (heat producing and wasted) IR drop in the voltage dropping circuit. This effectively continuous heating of the dropping resistors eventually causes both circuit and hardware fatigue.

SUMMARY OF THE INVENTION

In accordance with the present invention, the coarse adjustability, substantial power consumption and heat generation characteristics of conventional electrolysis water purification systems are obviated by a new and improved control mechanism through which the rate of production of ions from the electrodes to which the voltage control mechanism is coupled may be made effectively infinitely adjustable over a continuous ionization energy supply range without the generation or absorption of unnecessary and unwanted power losses. To this end the control mechanism of the present invention employs a fixed magnitude ionization current source the output of which is effectively pulse-width modulated, by controlled switching of the connection of the current source to the ionizing electrodes. As a consequence, ion production can be controlled as a percentage of water flow time (the period during which the filtration pump is operating) and is evenly distributed throughout the water to be purified.

In accordance with a preferred embodiment of the present invention, the output of a prescribed DC power supply is coupled through a controlled switching circuit to the ionizing electrodes. The controlled switching circuit includes a presettable timer-controlled switch that operates under the control of clock generator and establishes the duty cycle of the supply of ionizing current to the electrodes. The output of the presettable timer-controlled switch is coupled through a timer-controlled polarity reversing circuit to the ionizing electrodes.

The polarity reversing circuit serves to periodically reverse the current flow through the ionizing electrodes to ensure uniform wear of the electrodes and automatic cleaning of the deposits off the electrodes. Preferably the timing control mechanism of each of the presettable timer-controlled switch and timer-controlled polarity reversing circuit comprises a cascaded, user-presettable counter arrangement through which the degree of purification is adjustably controllable. The ionization potential control mechanism of the present invention also includes a modulation-bypass circuit, manually operable by the user, through which the ionizing potential from the DC source may be continuously applied to the ionizing electrodes during the filtration cycle of the system. Although the modulation mechanism is by passed, the automatic polarity reversing circuit continues to successively cycle to maintain efficient operation of the ionizing electrodes. At the termination of the filtration cycle the modulation bypass circuit is automatically returned to its normal state (i.e. off) which, in turn, allows controlled switching circuit-modulation of the output for subsequent filtration cycles.

BRIEF DESCRIPTION OF THE DRAWINGS

FIG. 2 is a diagrammatic illustration of the configuration of the ionization controller/modulator 21 employed in the water purification system shown in FIG. 1.

DETAILED DESCRIPTION

Figure 1:
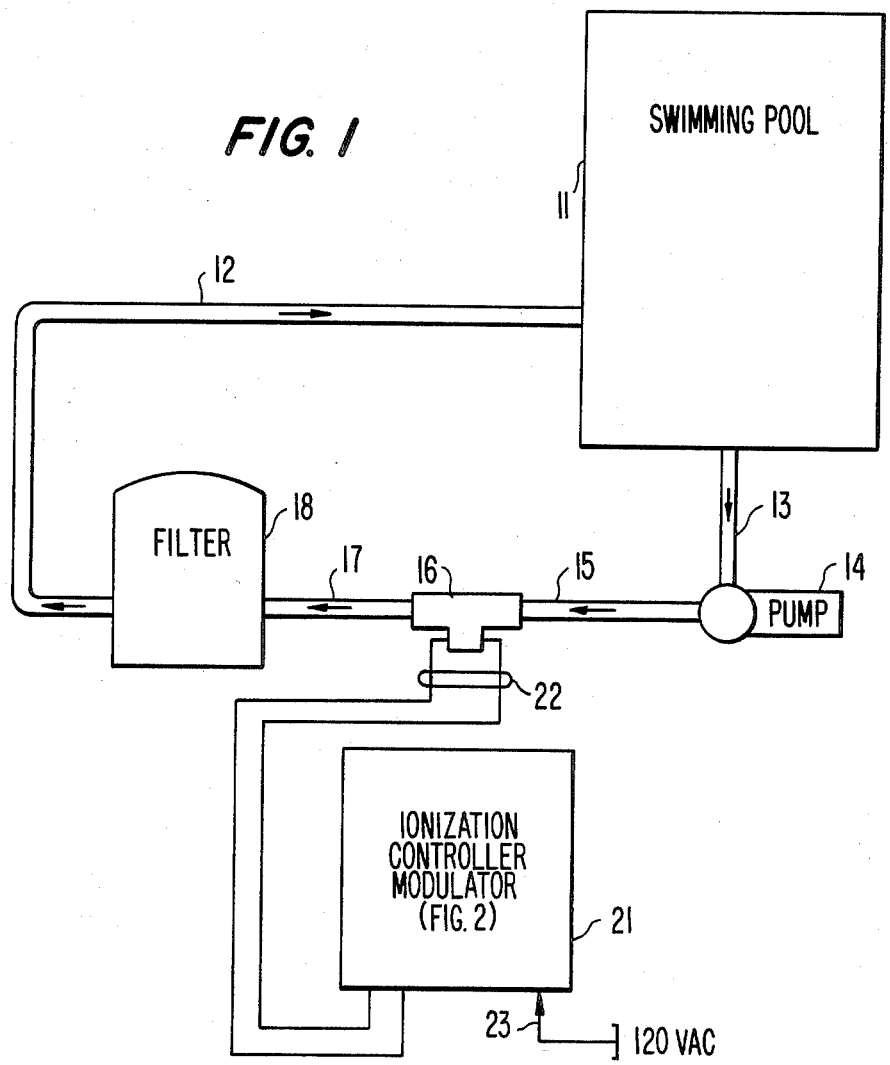
FIG. 1 is a block diagram of a water purification system employing the electrolysis control mechanism of the present invention.

A diagrammatic illustration of a water purification system in which the present invention may be employed is shown in FIG. 1 as including a water reservoir 11, such as a swimming pool, hot tub or spa, to which respective water circulation input and output lines 12 and 13 are coupled. In a swimming pool, line 13 may be coupled to the main drain at the deep end of the pool and to the skimmer, and serves to draw water from the pool towards a purification/filter section under the action of an in-line pump 14. The output of pump 14 is coupled through line 15 to an electrolysis ionization chamber 16. Ionization chamber 16 has a pair of spaced apart metal electrodes (e.g. copper and silver alloy electrodes) respectively coupled via ionization potential supply lines 22 to an ionization controller/modulator unit 21 (to be described in detail below with reference to FIG. 2). Within ionization chamber 16, metallic (copper and silver) ions are injected into water that has been introduced into the chamber via line 15 and which then exits therefrom via line 17 to a purification filter 18.

When injected into the water line, the ions kill and trap impurities in the water being pumped through the system and the resulting particulates are captured by filter 18 to be removed from the water flow system. The purified water is then supplied over conduit 12 back into reservoir (e.g. pool) 11.

As pointed out briefly supra, conventional control mechanisms for controlling the application of ionization potentials to the electrodes within ionization chamber 16 comprise a bank or set of fixed resistors coupled between a large valued DC power supply and the electrodes within the chamber. The degree of water purification (and consequently the granularity of particulates) performed by the ionization purification system is established by controllably inserting (by an external switch) one or more of the resistors of the voltage dropping resistor bank. As mentioned above, not only does such a control mechanism provide only a coarse adjustment of the filtration properties of the system, but it causes a substantial heat loss through the control mechanism (which, in and of itself, constitutes an undesirable waste of electrical energy).

In addition deposits which build up on the electrodes are removed by periodically manually operating a polarity reversing switch, that causes the polarity connection from the voltage dropping resistor bank to the ionizing electrodes to be reversed. After the potential has been reversed for some prescribed period of time (sufficient to effectively rid the anodes of its unwanted deposits), the potential connection is again manually reversed, so that proper operation of the electrodes may be maintained.

In accordance with the present invention, rather than employ a set of manually controlled voltage dropping resistors for controlling the ionization energy and a separate manually controlled switch for reversing the polarity of the potentials for cleaning the electrodes of the ionization chamber, the application of ionizing energy to the electrodes of the electrode chamber is effected through an ionization controller/modulator, the details of which are shown in FIG. 2, which effectively comprises a pulse width modulator through which the electrical energy to be supplied to the ionizing electrodes is time-modulated.

More particularly, with attention directed to FIG. 2, the present invention is shown as comprising a DC power supply 31 which is controllably enabled by a process cycle timer unit 32 and the output of which is coupled to a current modulator 33. DC power supply unit 31 may comprise a conventional AC/DC converter which plugs into a standard 120 VAC wall outlet and produces a fixed DC output voltage on the order of 12 volts. The process cycle timer unit 32, to which the DC power supply unit 31 is coupled, preferably comprises a 24 hour timer unit having "on" and "off" settings for establishing times of day of pool pump operation and thereby filtration system use which are presettable by the water system user.

Current modulator unit 33 preferably comprises an electronically controlled switching circuit coupled in the current supply path between DC power supply unit 31 and a polarity reversing circuit 34. The electronically controlled switching circuit of current modulator is selectively enabled by one of an externally presettable counter circuit 42 or a manually actuated booster circuit 61. When enabled or closed, the switching circuit of current modulator 33 directly connects the output of the DC power supply 31 through a polarity reversing circuit 34 to the electrode coupling link 22 which supplies ionization potentials to the respective electrodes of the ionization chamber 16 in the water system filtration unit (described above with reference to FIG. 1). Polarity reversing circuit 34 is selectively controlled by a timer unit comprised of a polarity reversing control counter 43, for periodically controlling the reversal of the polarity of the output of the DC power supply 31 to the ionizing electrodes.

Figure 3:
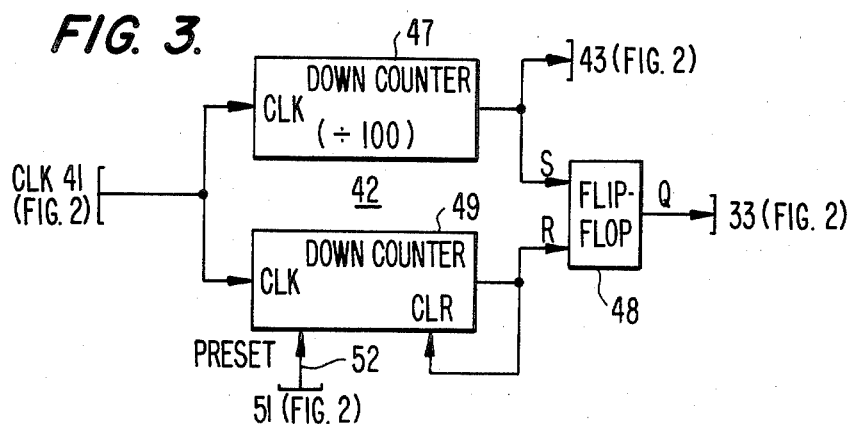
FIG. 3 is a diagrammatic illustration of the configuration of presettable counter circuit 42, shown in FIG. 2.

For controlling the pulse width modulation of the output of DC power supply unit 31, the ionization controller/modulator of the present invention employs a clock pulse generator 41 which produces an output clock signal having a prescribed frequency (e.g. 100 Hz), which is applied to a presettable counter circuit 42. As shown in FIG. 3, presettable counter circuit 42 preferably contains a dual counter/divider comprising a first down-counter 47, which divides the 100 Hz clock output of clock pulse generator 41 by a predetermined count (e.g. 100) and produces an output pulse which is employed to set an internal one-bit latch (flip-flop) circuit 48 within the dual counter/divider. The Q output of this internal flip-flop is coupled to the enable input of the electronically controlled switching circuit of current modulator 33 so that, when set, the internal latch of the dual counter/divider causes the output of DC power supply unit 31 to be coupled to polarity reversing circuit 34.

The dual counter/divider further includes a second down-counter 49 which is coupled to count the pulses generated by clock pulse generator 41 by a presettable count value and produce an output when the second down-counter 49 has counted down to that presettable value. This value is externally presettable, as by way of user interface panel 51 (the coupling of which to down-counter 49 is indicated by broken line 52).

When down-counter 49 counts down to zero from the value preset via line 52, it produces an output pulse which resets flip-flop 48. Thus, by the use of the dual counter mechanism, the Q output of flip-flop 48 goes high once each second, and then changes state or goes low at a prescribed time within each one second repetition interval, as defined by the user and preset within the second down-counter 49. The output of the second down-counter 49 is also coupled to its clear input to reset the down-counter 49 upon resetting the internal flip-flop 48.

In operation, for each 100 (100 Hz) clock pulses produced by clock pulse generator 41, down-counter 47 produces an output which sets flip-flop 48, while down-counter 49 produces an output after the elapse of some user-preestablished number of clock pulses, which output then resets flip-flop 48. Since the Q output of flip-flop 48 is coupled to the enable inputs of the electronically controlled switch circuit components of current modulator 33, it can be seen that the combination of clock pulse generator 41 and presettable counter/circuit 42 controllably establish the duty cycle and, consequently, the quantity of ions produced by the ionizing electrodes within the ionization chamber of the electrolysis system.

As pointed out previously, polarity reversing circuit 34 controllably reverses the connections of the output of the current modulator 33 to the electrodes of the ionization chamber. The duty cycle of this polarity reversal is preferably set at 50% so that, while one of the copper/silver alloy electrodes is injecting ions into the water, the other of the electrodes on which deposits have been formed is being purged of deposits. The length of time that the polarity is reversed is controlled by a polarity reversing control counter 43, which is coupled to the output of down-counter 47 within presettable counter circuit 42 and counts the one second pulses produced thereby over a prescribed time interval (e.g. 256 seconds 4 minutes). After counting the prescribed number of one second pulses produced by down-counter 47 of presettable counter circuit 42, polarity reversing control counter 43 produces an output which changes state, thereby reversing the connection of the output of current modulator 33 over coupling link 22 to the respective electrodes of the ionization chamber. As a result, every four minutes one of the electrodes is coupled as an ionization source while the other electrode is being cleaned. After the four minute duration, the connections are reversed.

Now, although the present invention permits the user to preset the operation of the ionization purification system, by establishing the duty cycle through which the switching components of the current modulator 33 are controllably enabled by presettable counter circuit 42, and thereby provide a very precise mechanism for establishing the purification characteristics of the water purification and filtration system to which the controller/modulator is coupled, the present invention also provides the user with the capability bypassing the modulation mechanism to effectively provide a 100% usage of the ionization chamber. The effect may be thought of as being similar to a chemical 'shock' of a swimming pool wherein a large dosage of chlorine is added to a pool to provide an overnight waste purge or cleansing. Substantially the same cleansing effect may be achieved in the ionization purification system in accordance with the present invention through the use of a manually operated boost circuit 61 the output of which is coupled to current modulator 33.

Boost circuit 61 comprises a manual override circuit for the current modulator 33 which is externally enabled via link 53 from an external switch on the user interface control panel 51. Boost circuit 61 effectively clamps the control inputs of the switching elements of current modulator 33 to an enable potential for a single filtration cycle, the switch is intercoupled with the process cycle timer 32, so that for the entire duration of the operation of the purification/filtration system (e.g. pool pump is 'on'), current modulator 33 does not respond to the output of presettable counter circuit 42, but is rather used simply as direct connection between the output of DC power supply circuit 31 and polarity reversing circuit 34. It is to be noted that clock generator 41, presettable counter circuit 42 and polarity reversing control counter 43 continue to operate in their normal mode, so that polarity reversing circuit 34 has its outputs reversed periodically (e.g. every four minutes, as described above). Thus, the respective electrodes of the ionization chamber are alternately utilized for ionization injection and cleansing of deposits; only the operation of the current modulator 33 is changed from a pulse width modulation mode to a permanent enable mode for a single purification/filtration cycle.

As will be appreciated from the foregoing description, the ion generator system in accordance with the present invention provides a mechanism through which the introduction of ions into the ion chamber of a water purification electrolysis system may be controlled with high accuracy and precision. Since the mechanism involves the control of the time (pulse width modulation) of ionizing electrode energization by a constant magnitude ionizing current source, ion production rate can be controlled as a presettable percentage of total operation time of the pump employed in water filtration system. Interfacing of the timing control mechanism with a polarity reversing control circuit also provides a means for automatically maintaining proper operation of the electrodes of the ionization chamber.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with an ionization apparatus for a water purification system, ionizing electrodes of which are arranged to be coupled in the water flow path of the system for providing a controlled quantity of ions in response to the coupling of ionization potentials thereto, an arramgement for controllably coupling ionizing potentials to said electrodes comprising in combination:

first means for providing a source of ionization potential to be coupled to said electrodes; and
   second means, coupled between said first means and said electrodes, for controllably modulating the duration of application of said ionization potential to said electrodes, said second means including means for controllably varying the duty cycle of the modulation of the duration of application of said ionization potential to said electrodes.

2. An arrangement according to claim 1, wherein said second means includes means for controlling the polarity of application of said ionization potential to said electrodes.

3. An arrangement according to claim 2, wherein said second means includes means for periodically reversing the polarity of application of said ionization potential to said electrodes.

4. An arrangement according to claim 1, further including third means, coupled to said second means, for ccntrollably preventing said second means from modulating the duration of application of said ionization potential to said electrodes for a prescribed period of time.

5. An arrangement according to claim 1, wherein said second means includes means for controlling the polarity of application of said ionization potential to said electrodes.

6. An arrangement according to claim 5, wherein said second means includes means for periodically reversing the polarity of application of said ionization potential to said electrodes.

7. An arrangement according to claim 6, further including third means, coupled to said second means, for controllably preventing said second means from modulating the duration of application of said ionization potential to said electrodes for a prescribed period of time.

8. An arrangement according to claim 2, wherein said second means includes means for generating a sequence of clock pulses, and first counter means for counting said clock pulses and causing said ionization potential to be coupled to said electrodes in response to the number of clock pulses counted thereby reaching a first prescribed count, and causing said ionization potential to be decoupled from said electrodes in response to the number of clock pulses counted thereby reaching a second prescribed count.

9. An arrangement according to claim 8, wherein said second means includes means for periodically reversing the polarity of application of said ionization potential to said electrodes.

10. An arrangement according to claim 9, wherein said periodically reversing means includes second counter means, coupled to said first counter means, for counting the number of times that said first counter means causes said ionization potential to be coupled to said electrodes and reversing the polarity of application of said ionization potential to said electrodes in response to said number of times reaching a prescribed number.

11. An arrangement according to claim 4, wherein said first means comprises means for controllably providing said source of ionization potential, to be coupled to said electrodes, for said prescribed period of time.

12. For use with an ionization apparatus for a water purification system having first and second electrodes that are coupled in the water flow path of the system and are to be controllably electrically biased to provide a controlled quantity of ions for purifying water, an arrangement for controllably coupling an ionizing bias differential across said electodes comprising, in combination:

first means, having first and second output terminals, for providing a source of ionizing bias differential thereacross; and second means, between said first and second output terminals and said first and second electrodes, for controllably modulating the duration of application of said ionizing bias differential across said first and second electrodes, said second means including means for controllably varying the duty cycle of the duration of the application of said ionizing bias of differential across said first and second electrodes.

13. An arrangement according to claim 12, wherein said seccnd means includes means for controlling the direction of application of said ionizing bias differential across said first and second electrodes.

14. An arrangement according to claim 13, wherein said second means includes means for periodically reversing the direction of application of said ionization potential across said first and second electrodes.

15. An arrangement according to claim 12, further including third means, coupled to said second means, for controllably preventing said second means from modulating the duration of application of said ionization bias differential across said first and second electrodes for a prescribed period of time.

16. For use with a water purification system wherein controlled ionizing potentials are applied to ionizing electrodes which are arranged to be coupled in the water flow path of the system for providing a controlled quantity of ions for purifying the water, a method of controlling the application of ionizing potentials to said electrodes comprising the step of:

(a) controllably modulating the duration of application of ionizing potantials to said electrodes, step (a) including controlling the duty cycle of the modulation of the application of ionizing potentials to said electrodes.

17. A mathod according to claim 16, further including the step of:

(b) periodically reversing the polarity of application of ionizing potentials to said electrodes.

* * * * *